United States Patent
Stobbe

(10) Patent No.: US 8,316,841 B2
(45) Date of Patent: Nov. 27, 2012

(54) ENERGY TRANSMITTING PANEL, FOR INVISIBLE INCORPORATION INTO A BUILDING AND A CASSETTE COMPRISING SUCH PANEL

(75) Inventor: Per Stobbe, Holte (DK)

(73) Assignee: Cupa Innovacion, S.L.U., Vigo, Pontevedra (ES)

( * ) Notice: Subject to any disclaimer, the term of this patent is extended or adjusted under 35 U.S.C. 154(b) by 224 days.

(21) Appl. No.: 12/596,306

(22) PCT Filed: Jan. 22, 2008

(86) PCT No.: PCT/DK2008/000022
§ 371 (c)(1),
(2), (4) Date: Feb. 18, 2010

(87) PCT Pub. No.: WO2008/128537
PCT Pub. Date: Oct. 30, 2008

(65) Prior Publication Data
US 2010/0147288 A1 Jun. 17, 2010

(30) Foreign Application Priority Data

Apr. 18, 2007 (DK) ................................. 2007 00565

(51) Int. Cl.
*F24J 2/50* (2006.01)

(52) U.S. Cl. ........ 126/621; 126/705; 126/622; 126/623; 126/634; 126/706

(58) Field of Classification Search ............... 126/621, 126/622, 623, 634, 660, 704, 705; 52/536, 52/553
See application file for complete search history.

(56) References Cited

U.S. PATENT DOCUMENTS

| | | | |
|---|---|---|---|
| 4,083,360 A | 4/1978 | Courvoisier et al. | |
| 4,111,188 A | 9/1978 | Murphy, Jr. | |
| 4,197,834 A * | 4/1980 | Nevins | 126/622 |
| 4,221,208 A | 9/1980 | Murphy, Jr. | |
| 4,222,368 A | 9/1980 | Rost et al. | |
| 4,244,355 A | 1/1981 | Stout | |
| 7,610,911 B2 * | 11/2009 | Neumann et al. | 126/622 |
| 2005/0199234 A1 | 9/2005 | Leighton | |

FOREIGN PATENT DOCUMENTS

BE 1013610 4/2002

* cited by examiner

*Primary Examiner* — Alfred Basichas
(74) *Attorney, Agent, or Firm* — Merchant & Gould P.C.

(57) ABSTRACT

An energy transmitting solar panel (12, 22, 32, 42, 52, 62) intended for invisible incorporation into a building, a part or component thereof, behind and in thermal contact with a climate shield (12, 21, 31, 41, 51, 61) on said building, a part or component thereof, is made of a heat-conducting material and has a substantial heat transmitting surface area and at least one through-going fluid impervious channel or duct (15, 25, 35, 45, 55, 65) embedded in or integrally connected with said panel for the flow of an energy carrying-capable fluid therein. The solar panel is mounted below and close up to a climate shield of a building so that good thermal contact is established there between providing excellent transmission of converted sun radiation to an energy carrying-capable fluid in the fluid impervious channel or duct.

17 Claims, 7 Drawing Sheets

ENERGY TRANSMITTING PANEL, FOR INVISIBLE INCORPORATION INTO A BUILDING AND A CASSETTE COMPRISING SUCH PANEL

This application is a National Stage Application of PCT/DK2008/000022, filed 22 Jan. 2008, which claims benefit of Serial No. PA 2007 00565, filed 18 Apr. 2007 in Denmark and which applications are incorporated herein by reference. To the extent appropriate, a claim of priority is made to each of the above disclosed applications.

FIELD OF THE INVENTION

The present invention relates to the area of solar heating collectors which absorb the radiation from the sun and convert the radiation into heat and convey this heat energy suitable for heating purposes such as in a building, a swimming pool, or for tap water.

BACKGROUND OF THE INVENTION

Any climate shield on roofs and facades on buildings are always constructed of many smaller parts constituting the shield against the nature. Such as tiles, plates of treated steel, of natural stone, of untreated copper and zinc and other metals, bitumen based, cement based composites, inorganic fibre based shingles also known as Eternit® slates and other exotic materials and ceramics.

For centuries a climate shield consisting of natural slates of small dimensions like e.g. 150-200 mm width, 200-600 mm length and 6-10 mm thickness has been used for roof and facade constructions in many countries. Such natural slates, also known as quarry slates, originate from natural shale found in the subsoil at different geographic locations have typically a grey over red to black coloured surface which is suitable as a solar energy absorbing surface. In many countries such climate shields are considered exclusive and desirable on exclusive buildings and houses. Such houses are found in areas where demands are placed on the appearance of the houses and frequently it is required that the houses appear without technical contraptions placed on the climate shield. This prohibits the mounting of conventional solar collectors which are clearly visible when placed on the outside of a climate shield. This condition is an important background for the present invention.

The natural slates or artificial shingles are mounted individually but overlapping each other's on wood laths, battens and secured mechanically by one or more nails thereto. The battens are typically mounted horizontally spaced apart by a distance of 100-300 mm on much heavier rafters being the primary roof support.

Only for one hundred years rolled metal climate shields such as the standings seam metal sheets suitable for roof covering and facades in any angle and pitch between 20 and 90 degree, has been used. The quite narrow and often very long metal sheets are shaped for internal water proof connections via longitudinal joints, seaming and typically transversely overlap to form a full metal covering. Each seam has a joint typically extending 15-30 mm from the sheet covering improving water tightness. Metals typically used are zinc, coated zinc, coated steel or aluminium in thickness from 0.8 to 1.5 mm in various colours.

RELATED PRIOR ART

There are three main kinds of solar thermal collectors in common use: Formed Collectors, Flat Collectors, and Evacuated Tube Collectors.

Formed Plastic Collectors (such as polypropylene, EPDM or PET plastics) consist of tubes or formed panels through which water is circulated and heated by the sun's radiation and is used for extending the swimming season in swimming pools. In some countries heating an open-air swimming pool with non-renewable energy sources is not allowed, and then these inexpensive systems offer a good solution. This panel type is not suitable for year round uses like providing hot water for home use, primarily due to its lack of insulation which reduces its effectiveness greatly when the ambient air temperature is lower than the temperature of the fluid being heated. Is also know made from metals.

A flat collector consists of a thin absorber sheet (usually aluminium or copper to which a black or selective coating is applied) backed by a grid or metal coil of fluid handling tubing and placed in an insulated casing with a glass top cover. Fluid is circulated through the tubing to remove the heat from the absorber and transport it to an insulated water tank, to a heat exchanger, or to some other device for using the heated fluid.

Instead of metal collectors, some new polymer flat plate collectors are now being produced in Europe. These may be wholly polymer, or they may be metal plates behind which are freeze-tolerant water channels made of silicone rubber instead of metal. Polymers, being flexible and therefore freeze-tolerant, are able to use plain water in them instead of antifreeze, so that in some cases they are able to plumb directly into existing water tanks instead of needing the tank to be replaced by one with extra heat exchangers.

Evacuated tube collectors are made of a series of modular tubes, mounted in parallel, whose number can be increased or reduced as hot water delivery needs change. This type of collector consists of rows of parallel transparent glass tubes, each of which contains an absorber tube (in place of the absorber plate to which metal tubes are attached in a flat-plate collector). The tubes are covered with a special light-modulating coating. In an evacuated tube collector, sunlight passing through an outer glass tube heats the absorber tube contained within it.

Two types of tube collectors are distinguished by their heat transfer method: the simplest pumps a heat transfer fluid (water or combined with antifreeze) through a U-shaped metal tube placed in each of the glass collector tubes. The second type uses a sealed heat glass pipe that contains a liquid that vaporizes as it is heated. The vapour rises to a heat-transfer bulb that is positioned outside the collector tube in a pipe through which a second heat transfer liquid (the water or antifreeze) is pumped. For both types, the heated liquid then circulates through a heat exchanger and gives off its heat to water that is stored in a storage tank (which itself may be kept warm partially by sunlight). Evacuated tube collectors heat to higher temperatures, with some models providing considerably more solar yield per square meter than flat panels. However, they are more expensive and fragile than flat panels.

All the above solar collectors will change the appearance and character of a building on which they are mounted, considerably. Flat collectors are typically incorporated into a rectangular box having dimensions of about 1×2 meters with a glass pane at the top and about 100 mm insulation at the bottom. This design limits the prevalence of solar collectors considerably, but their costs and complexity and the necessity to rebuild the constructions involved and change their appearance and character are a more important limitation for their common distribution.

U.S. Pat. No. 4,244,355 discloses a solar panel system comprising solar panel modules, each of which has a collector housing constructed of high temperature fibreglass reinforced plastic, die stabbed steel or aluminium covered by a fibre-glass reinforced plastic translucent top portion. The collector housing contains a collector plate preferably constructed of copper with an absorptive coating. Between the top cover and the collector plate there is a dead air space and at the underside of the collector plate there is a plurality of tubes for carrying a liquid to be heated by the solar collector. This solar collector module is mounted visible in a roof construction instead of a part of the normal roof elements used for the climate shield.

US patent application publication no. 2005/0199234 A1 discloses a heating and cooling system which is to be structurally incorporated into an exterior building portion having an interior side. At least one support member having a fastening portion and a channel is mounted proximate to the interior side of the exterior building portion and at least one radiant heat tube is disposed in each channel and mounted proximate to the interior side of the exterior building portion by each support member. A heat-carrying medium is transmitted through the radiant heat tube and a radiant heat reflective surface is mounted proximate to the radiant heat tube. This heating and cooling system is intended to be incorporated invisible below a climate shield on a building, but the radiant heat tube is not an integral part of the support member which furthermore has a rather limited surface area so that only a small proportion of the underside of the climate shield is covered or may be in thermal contact with the support member. This creates bad transmission of heat energy between the underside of a climate shield and the heat-carrying medium in the radiant heat tube.

Hence, there is a need for a solar collector or energy transmitting device intended for invisible incorporation into a building, a part of component thereof, behind a climate shield on said building and in which the transmission of heat energy between the underside of a climate shield and the heat-carrying medium is excellent.

BRIEF DESCRIPTION OF THE INVENTION

This need is met by the energy transmitting panel according to the present invention which is intended for invisible incorporation into a building, a part or component thereof, behind and in thermal contact with a climate shield on said building, a part or component thereof, said panel being made of a heat-conducting material and having a substantial heat transmitting surface area and at least one through-going fluid impervious channel or duct integrally embedded in or connected with said panel for the flow of an energy carrying-capable fluid therein.

The invention also relates to an energy transmitting cassette intended for invisible incorporation into a building, a part or component thereof, behind and in thermal contact with a climate shield on said building, a part or component thereof, comprising an energy transmitting panel according to the invention combined with a housing forming a cavity together with the rear side of the panel, in which cavity an insulating material is provided.

Furthermore the invention concerns a combination of a building, a part or component thereof, comprising a climate shield and an energy transmitting panel according to the invention, wherein said climate shield is in effective thermal contact with said panel. In such combination the energy transmitting panel may be incorporated into a cassette according to the invention.

Particular and preferred embodiments of the different aspects of the invention are defined in the claims and described in the detailed description of the drawings which follows.

DETAILED DESCRIPTION OF THE DRAWINGS

Figure 1:
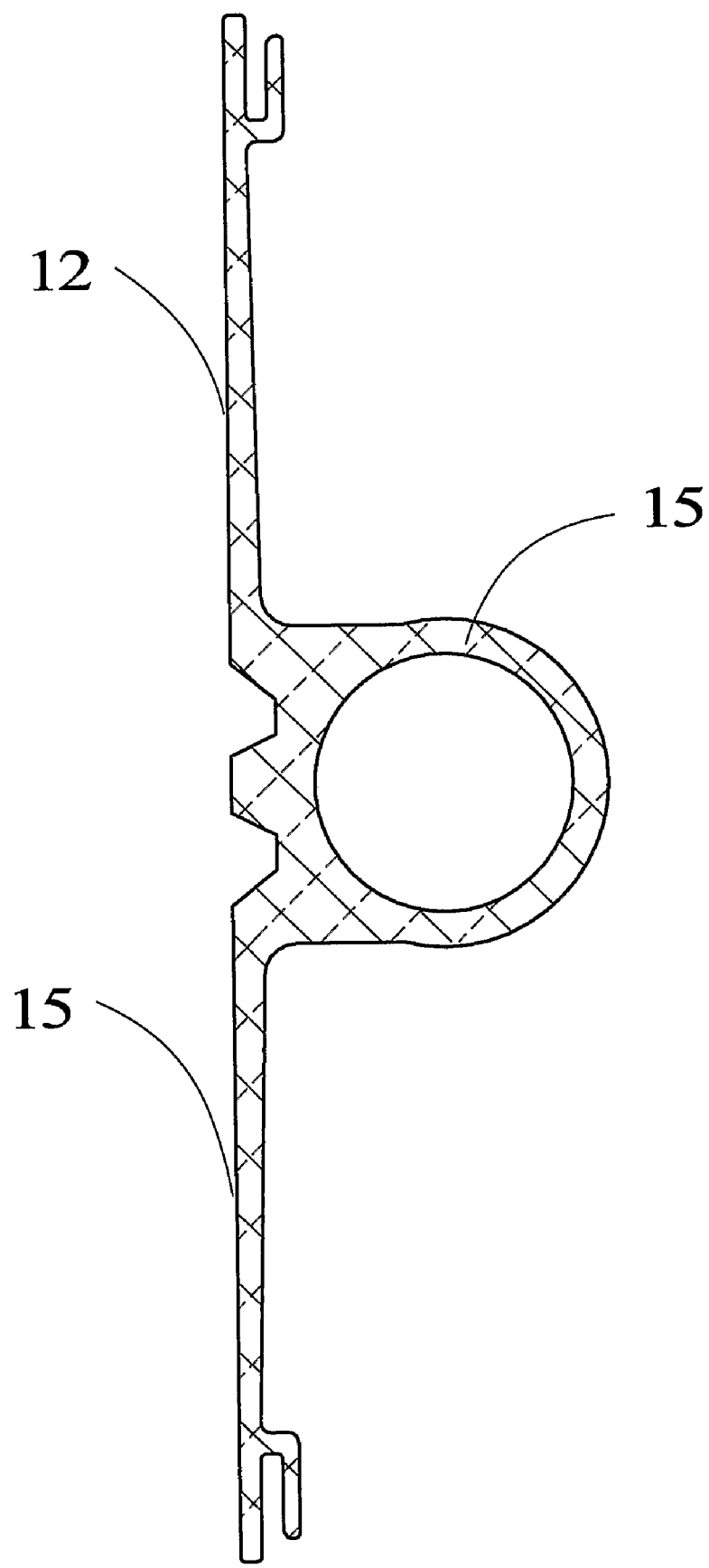
FIG. 1 shows a cross section of a heat conducting panel or membrane according to the present invention.

FIG. 1 shows a cross section of a heat conducting solar panel or membrane 12 according to the present invention. The panel has a substantial length (perpendicular to the plane of the drawing) and width; the length of the panel is usually much greater than the width of the same. At the underside and integral therewith the panel has a through-going fluid impervious channel or duct 15, which in use is filled with an energy carrying-capable fluid flowing from on end to the other of said channel or duct. The panel has a thickness of a few millimetres, e.g. 0.5 to 10 mm, preferably 1 to 3 mm, and is made of a material having good heat-conductance, e.g. a metal such as aluminium and aluminium alloys, copper and copper alloys types. Preferably the panel material has a thermal conductivity of at least 10 $Wm^2/K$.

The solar panel may be manufactured by an extrusion process used to create long objects of a fixed cross-section. By such process the material to be used is pushed in a heated condition through a die having the desired cross sectional shape. Hollow sections like the through-going channel/duct 15 are usually produced by placing a pin or piercing mandrel within the die. The extrusion process may be continues or semi-continues and create endless panels or panels having a length of typically 20-30 meters, which are straightened, cooled and cut into desired lengths of typically 6-8 meters ready for shipment.—In the case that the extrusion material is aluminium it is heated as a billet to about 400° C. before it is pushed through the die.

The energy carrying-capable fluid in the through-going channel or duct 15 may be a fluid, but is preferably a liquid such as typically water or a water-based fluid. In case of water or a water-based fluid it should contain an anticorrosive agent, inhibitor if the panel is made of aluminium and aluminium alloys and others. The fluid may preferably also contain an anti-freeze agent if temperatures below zero are to be expected.

Both ends of each fluid impervious channel or duct 15 are in use connected in parallel or serial arrangements or combinations thereof to other channels/ducts by respective manifolds and tubing leading to a heat exchange appliance, such as a water heater, a radiator, a central heating or cooling unit, a floor-heating unit, or a swimming pool.

When the sun is shining on a climate shield on a building in which the solar panel is incorporated below and close up to this climate shield the incident radiation impinging the climate shield is at least partly converted to heat energy which is transmitted through the climate shield and further on to the panel which transmit it directly to the energy carrying-capable fluid in the embedded or integrally connected channel/duct 15. Because the panel has a great surface area in direct effective thermal contact with a corresponding large area of the climate shield and because the panel is made of a material having excellent heat-conductance a very great proportion of the incident radiation energy is conveyed directly and effectively to the energy carrying-capable fluid in the embedded or integrally connected channel or duct of the panel. This proportion of converted and conveyed away radiation is much greater than hitherto obtainable with any prior art solar collector.

Figure 2:
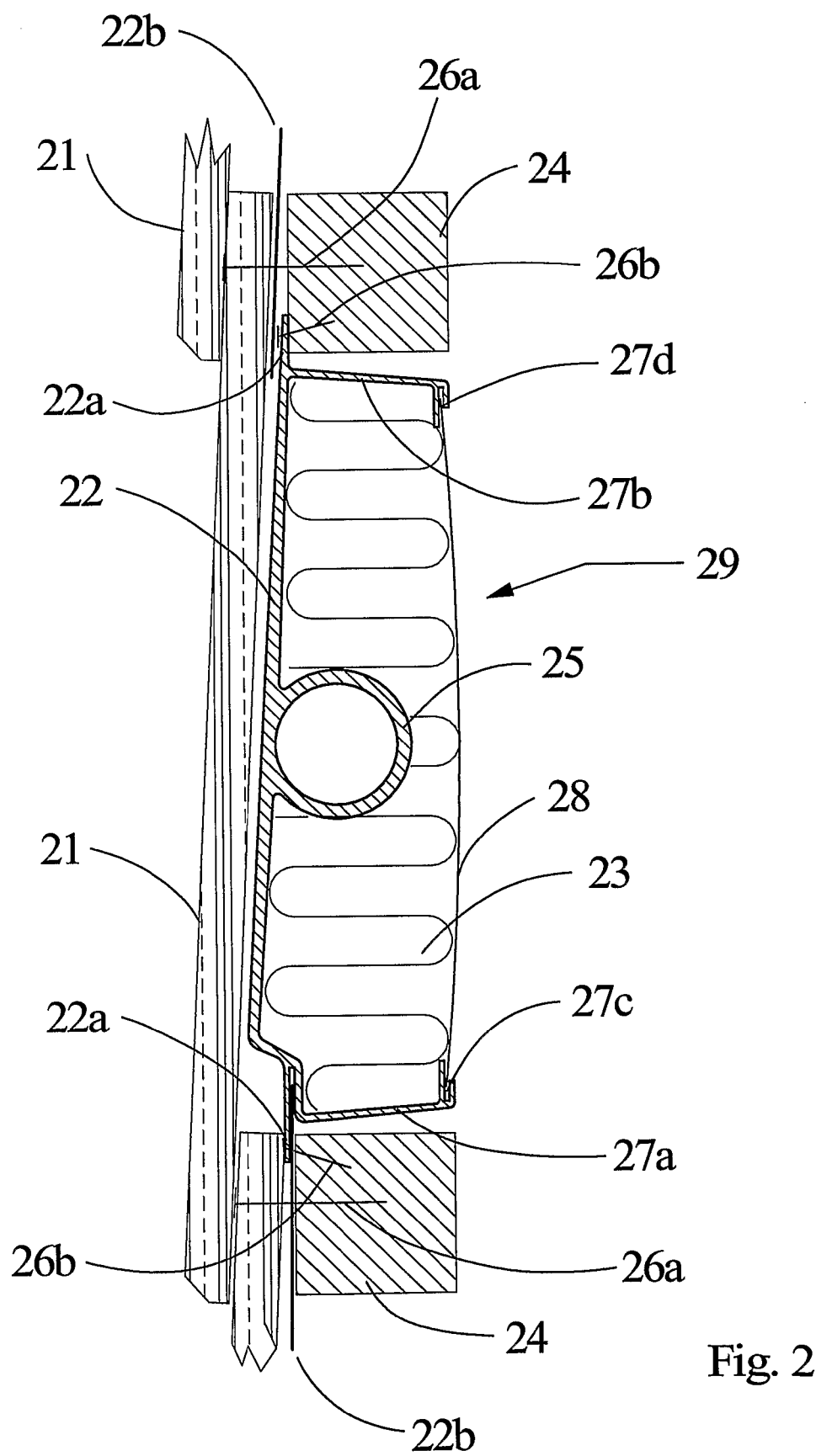
FIG. 2 shows a cross section in a part of a roof, the outer side of which is covered with a climate shield of natural slates below which and close thereto a heat conducting panel or membrane according to the present invention is mounted incorporated into a cassette.

FIG. 2 shows a cross section in a part of a roof, the outer side of which is covered with a climate shield 21 of natural quarry slates or man made ceramic slates. The slates 21 are secured to a framework of wood laths, battens 24, typically having a cross sectional width of 32-73 mm and height of 32-38 mm, by mechanical means 26a such as e.g. nails, screws etc. Below and close up to this climate shield a heat conducting panel or membrane 22 according to the present invention is mounted on the same framework of wood laths 24. The panel extends along a substantial length of the laths and the width of the panel is greater than the distance between two neighbouring laths so that the total area between two neighbouring laths is fully covered by the panel and there is an overlap 22a, 22b on the top of each lath rendering it possible to secure the panel to the laths by appropriate means 26b, e.g. nails, screws etc. At the underside and integral therewith the panel has a through-going fluid impervious channel or duct 25, which is filled with an energy carrying-capable fluid flowing from on end to the other of said channel or duct. The panel has a thickness of a few millimetres, e.g. 0.5 to 10 mm, preferably 1 to 3 mm, and is made of a material having good heat-conductance, e.g. a metal such as aluminium and aluminium alloys, copper and copper alloys types. Preferably the panel material has a thermal conductivity of at least 10 $Wm^2/K$.

The solar panel 22 has two integral lateral legs 27a, 27b extending substantially perpendicular to the plane of the top surface of said panel and longitudinally parallel with said through-going fluid impervious channel or duct 25 and a back plate 28 attached to the ends of said legs opposite the plane of the top surface of the panel 22 so as to form a cassette 29 according to the present invention having a cavity, in which an insulating material 23, such as glass wool, rock wool, expanded polystyrene etc., is provided. The integral legs 27a, 27b are of the same material as the panel, e.g. metal, whereas the back plate 28 may be of the same material, but may be also of a different material, e.g. a plastic. The back plate is secured to the ends of the legs by appropriate means, e.g. grooves in horizontal portions 27c, 27d at the distant ends of the legs opposite the top surface plane of the panel.

The top surface of the solar panel is in good thermal contact with the underside of the climate shield, but may never the less be profiled or corrugated. The gap between the top surface of the panel and the underside of the climate shield is therefore preferably as small as possible and is most preferably zero, which means that there is a direct physical contact between the top side of the panel and the underside of the climate shield. In practise, however, neither the top surface of the panel nor the underside of the climate shield is completely smooth and even so that a full area physical contact cannot be obtained completely.

Heat exchange from the rear side of the climate shield will be transmitted to the solar panel via infrared radiation, via direct mechanical contact conduction and via convection to the solar panel top surface. Since non coated metal surfaces reflects light and to some extend long wavelength infrared radiation the solar panel top surface may preferably be coated for improved absorption of the transmitted thermal energy from the rear side of the climate shield. Black paints are often not selective to specific wavelengths, but less costly to apply to large surfaces not being a sheet. Selective coatings may be tuned to be selective for the desired wavelength. Coatings also typically black, with great roughness on the surface or with crystalline structure acting like small lenses.

The panel may be manufactured by an extrusion process used to create long objects of a fixed cross-section. By such process the material to be used is pushed in a heated condition through a die having the desired cross sectional shape. Hollow sections like the through-going channel or duct 25 are usually produced by placing a pin or piercing mandrel within the die. The extrusion process may be continues or semi-continues and create endless panels or panels having a length of typically 20-30 meters, which are straightened, cooled and cut into desired lengths of typically 6-8 meters ready for shipment.—In the case that the extrusion material is aluminium it is heated as a billet to about 400° C. before it is pushed through the die.

The energy carrying-capable fluid in the through-going channels or ducts 25 may be a fluid, but is preferably a liquid such as typically water or a water-based fluid. In case of water or a water-based fluid it should contain an anticorrosive agent, anticorrosive inhibitor if the panel is made of metal like aluminium and aluminium alloys etc. The fluid may preferably also contain an anti-freeze agent if temperatures below zero degrees Celsius are to be expected.

Both ends of each fluid impervious channel or duct 25 in every panel are connected respectively in parallel or serial arrangements or combinations thereof by respective manifolds and tubing leading to a heat exchange appliance, such as a water heater, a number of radiators, a central building heating or central building cooling unit, a floor-heating unit, or a swimming pool.

When the sun is shining on the climate shield the incident radiation impinging the climate shield is at least partly converted to heat energy which is transmitted through the climate shield and further on to the panel which transmit it directly to the energy carrying-capable fluid in the embedded or integrally connected channel or duct 15. Because the panel has a great surface area in direct effective thermal contact with a corresponding large area of the climate shield and because the panel is made of a material having excellent heat-conductance a very great proportion of the incident radiation energy is conveyed directly and effectively to the energy carrying-capable fluid in the embedded or integrally connected channel or duct of the panel. The insulation 23 in the cavity of the cassette 29 prevents the heat absorbed by the panel 22 and the energy carrying capable fluid in the channel/duct 25 from being transmitted to building portions surrounding the cassette 29 and therefore also contributes to the energy efficiency of the panel 22 and cassette 29 according to the present invention. Hence, the proportion of converted and further conveyed radiation by the panel and cassette according to the present invention is much greater than hitherto obtainable with any prior art solar collector.

The rear side of the panel is in close contact with thermal insulating materials 23 for reducing the thermal losses to the building construction and hereby insure maximum thermal efficiency. The insulation material 23 will preferably have thermal conductivity lower than 0.5 $Wm^2/K$ selected and fabricated from various organic foam compositions or various inorganic or organic fibre materials.

The non-symmetrical design has excellent thermal contact to the rear side of the quarry slates and at the same time mechanical fastened to the rafters by nails or the like. Between each solar panel 0.5 mm thick and 50 mm wide aluminium sheets strips 22b are secured into the upper panel slot and overlapping the lower neighbouring solar panel by 10 mm. This feature insures a 100% fully covering and waterproofs metal membrane protecting the roof even if rain drops by wind is forced up under the two layer slate roof.

Figure 3:
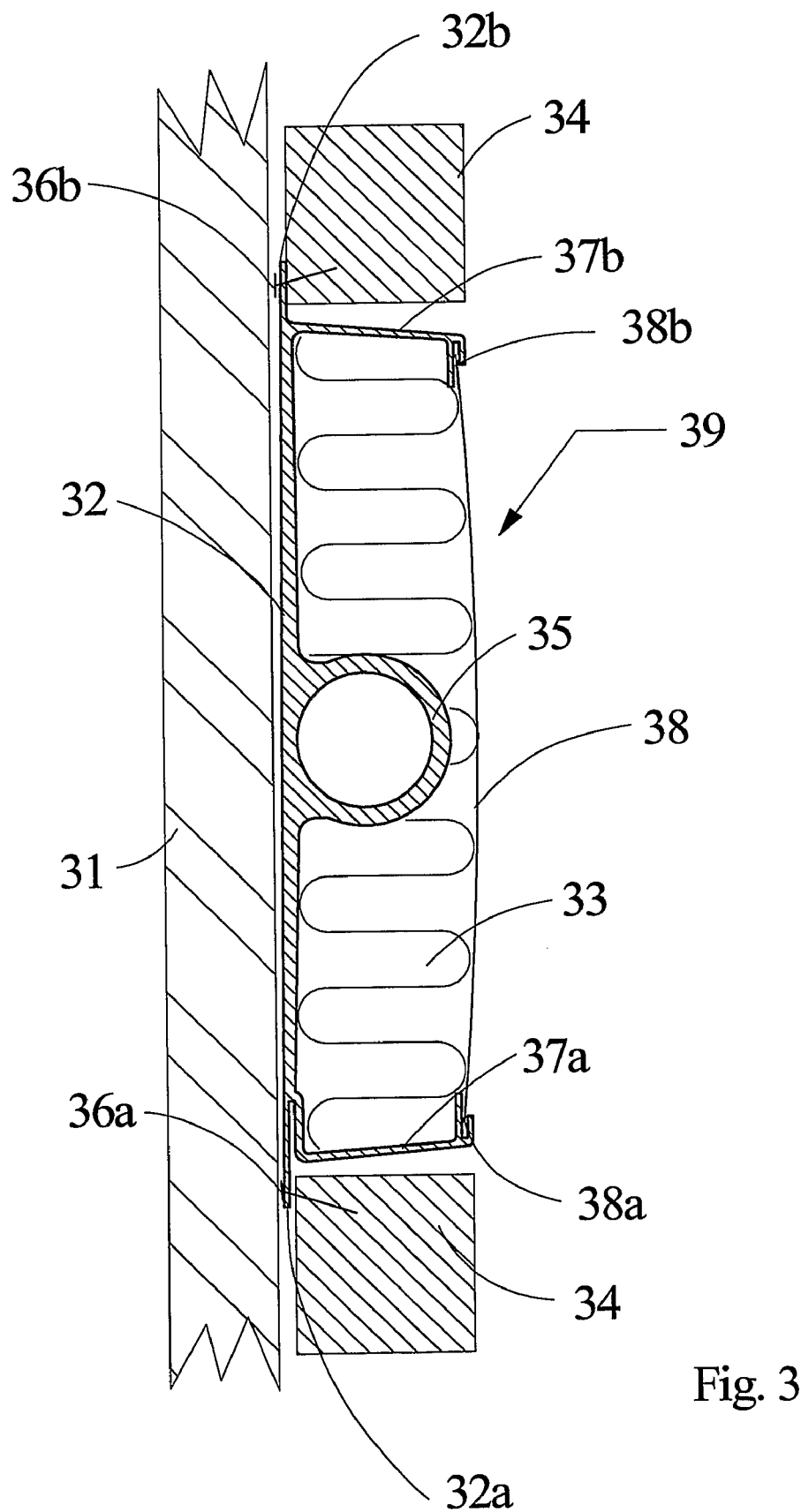
FIG. 3 shows a cross section in a part of a roof, the outer side of which is covered with a climate shield 31 of standing seam metal roof below which and close thereto a heat conducting panel or membrane according to the present invention is mounted incorporated into a cassette of different construction.

FIG. 3 shows a cross section in a part of a roof, the outer side of which is covered with a climate shield 31 of standing seam metal roof. The sheets 31 are secured to a framework of wood laths, battens 34, typically having a cross sectional width of 50-100 and height of 22-38 mm, by mechanical means 36a such as e.g. nails, screws etc. Below and close up to this climate shield a heat conducting panel or membrane 32 according to the present invention is mounted on the same framework of wood battens 34. The panel extends along a substantial length of the laths and the width of the panel is greater than the distance between two neighbouring laths so that the total area between two neighbouring laths is fully covered by the panel and there is an overlap 32a, 32b on the top of each lath, rafter rendering it possible to secure the panel to the laths by appropriate means 36b, e.g. nails, screws etc. At the underside and integral therewith the panel has a through-going fluid impervious channel or duct 35, which is filled with an energy carrying-capable fluid flowing from on end to the other of said channel or duct. The panel has a thickness of a few millimetres, e.g. 0.5 to 10 mm, preferably 2 to 4 mm, and is made of a material having good heat-conductance, e.g. a metal such as aluminium and aluminium alloys, copper and copper alloys. Preferably the panel material has a thermal conductivity of at least 10 $Wm^2/K$.

The panel 32 has a plane or slightly corrugated top surface and two lateral short legs or brackets 37a, 37b extending substantially perpendicular to the plane of the top surface of the panel and longitudinally parallel with the through-going fluid impervious channel or duct 35. The brackets 37a, 37b are provided with slots for engagement with corresponding slots on side walls 38a, 38b of a back plate 38 so as to form a cassette 39 according to the present invention having a cavity, in which an insulating material 33, such as glass wool, rock wool, expanded polystyrene, PUR etc., is provided. The back plate 38 and its side walls 38a, 38b is made of e.g. a plastic having low thermal conductivity.

In other respects the cassette 39 is and functions as described for the cassette 29 in FIG. 2.

Figure 4:
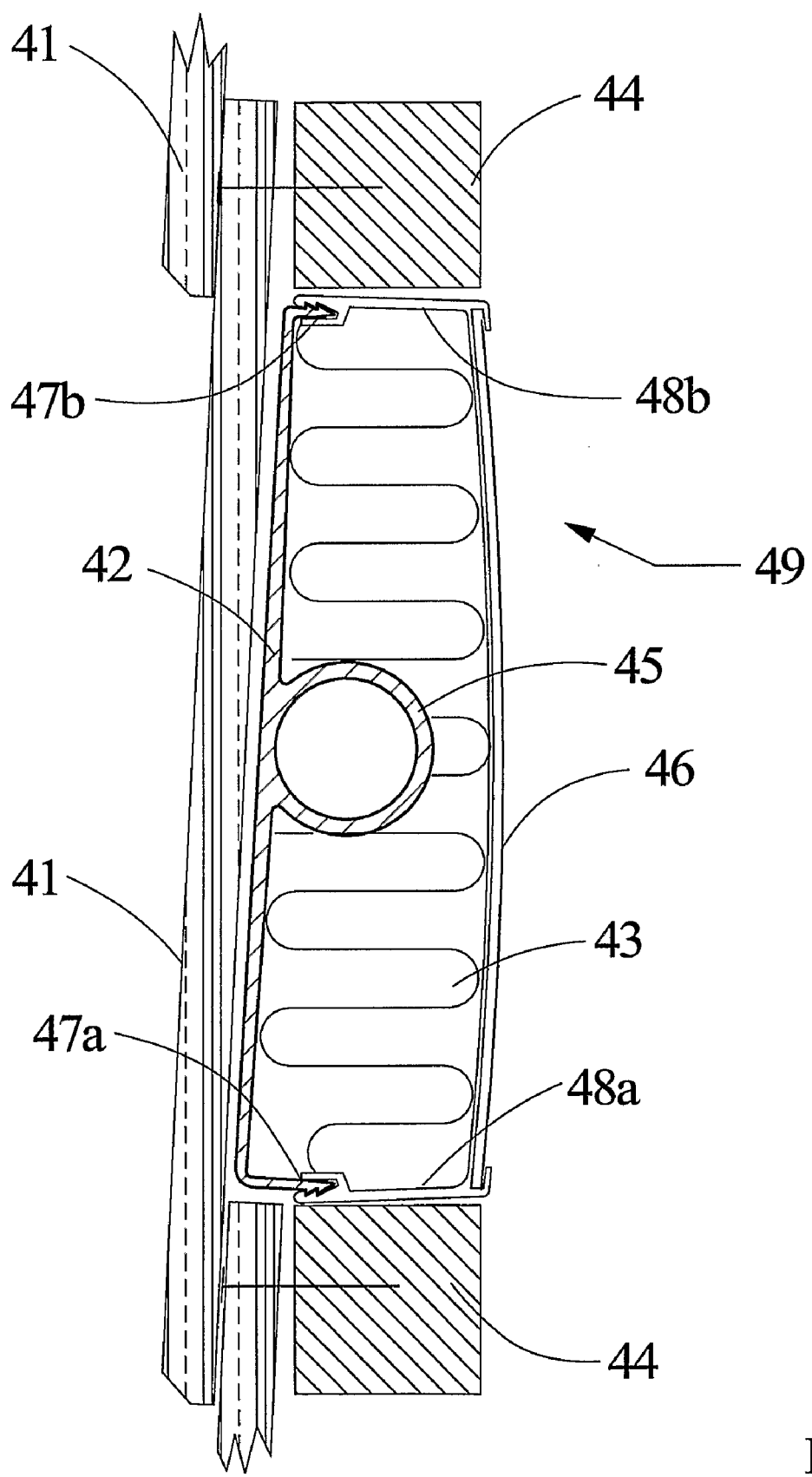
FIG. 4 shows as FIG. 2 a cross section in a part of a roof, the outer side of which is covered with a climate shield of natural slates below which and close thereto a heat conducting panel or membrane according to the present invention is mounted incorporated into a cassette of different construction.

FIG. 4 shows as FIG. 2 a cross section in a part of a roof, the outer side of which is covered with a climate shield 41 of natural quarry slates. The slates 41 are secured to a framework of wood laths, battens 44, typically having a cross sectional width of 32-73 mm and height of 32-38 mm, by mechanical means 46a such as e.g. nails, screws etc. Below and close up to this climate shield a heat conducting panel or membrane 42 according to the present invention is mounted in a free flowing cassette. At the underside and integral therewith the panel has a through-going fluid impervious channel or duct 45, which is filled with an energy carrying-capable fluid flowing from on end to the other of said channel or duct. The panel has a thickness of a few millimetres, e.g. 0.5 to 10 mm, preferably 1 to 3 mm, and is made of a material having good heat-conductance, e.g. a metal such as aluminium and aluminium alloys, copper and copper alloys. Preferably the panel material has a thermal conductivity of at least 10 $Wm^2/K$.

The panel 42 has a plane or slightly corrugated top surface and two lateral short legs or brackets 47a, 47b extending substantially perpendicular to the plane of the top surface of the panel and longitudinally parallel with the through-going fluid impervious channel or duct 45. The brackets 47a, 47b are provided with slots for engagement with corresponding slots on side walls 48a, 48b of a back plate 48 so as to form a cassette 49 according to the present invention having a cavity, in which an insulating material 43, such as glass wool, rock wool, expanded polystyrene etc., is provided. The back plate 48 and its side walls 48a, 48b is made of e.g. a plastic having low thermal conductivity.

The in between the battens and on top of the rafters floating cassette is provided with a plurality of flat metal sheet springs 46 abutting against each rafter of the roof and forcing the top surface of the panel 42 against the underside of the climate shield 41 of the roof to insure minimum air gab. The springs 46 are preferably of a tempered steel alloy sheet with forces capable to carry the complete cassette and ad further force. This important feature of the invention insures good thermal contact between the top surface of the solar panel and the rear side of the climate shield.

In other respects the cassette 49 is and functions as described for the cassette 29 in FIG. 2.

Figure 5:
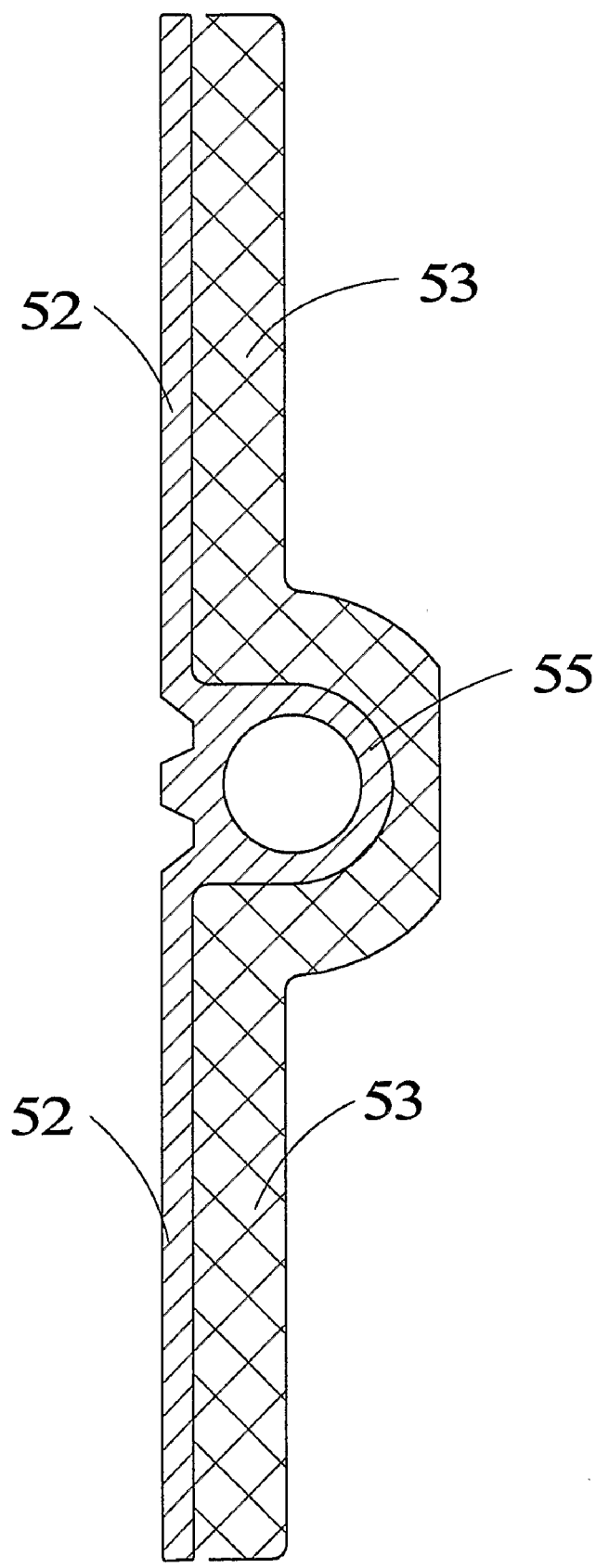
FIG. 5 shows a cross section of a heat conducting panel or membrane 52 according to the present invention for alternative use.

FIG. 5 shows a cross section of a heat conducting panel or membrane 52 according to the present invention for alternative use. The panel has a substantial length (perpendicular to the plane of the drawing) and width; the length of the panel is usually much greater than the width of the same. Panel length being typically in between 3-10 meters, preferably 5-7 meters. At the underside and integral therewith the panel has a through-going fluid impervious channel or duct 55, which in use is filled with an energy carrying-capable fluid flowing from one end to the other of said channel or duct. The panel has a thickness of a few millimetres, e.g. 0.5 to 10 mm, preferably 1 to 4 mm, and is made of a material having good heat-conductance, e.g. a metal such as aluminium and aluminium alloys, copper and copper alloys. Preferably the panel material has a thermal conductivity of at least 10 $Wm^2/K$.

The energy carrying-capable fluid in the through-going channel or duct 55 may be a fluid, and preferably a liquid such as typically water or a water-based fluid though protected against freezing. In case of water or a water-based fluid it should contain an anticorrosive agent or inhibitor if the panel is made of metals like aluminium and aluminium alloys.

The rear side of the panel is in close contact with thermal insulating materials 53 for reducing the thermal losses to the building construction and hereby insure maximum thermal efficiency for the invention. The insulation material 53 will preferably have thermal conductivity lower than 0.5 $Wm^2/K$ selected and fabricated from various organic foam compositions or various inorganic or organic fibre materials. Furthermore the insulation package may be mechanically protected on its outer side with a thin layer of plastic foil such as a plastic membrane 58 with the thickness of preferably only 0.5-2 mm. This membrane will also reduce the insulation materials ability to consume, absorb water vapour from the local environment.

Figure 6:
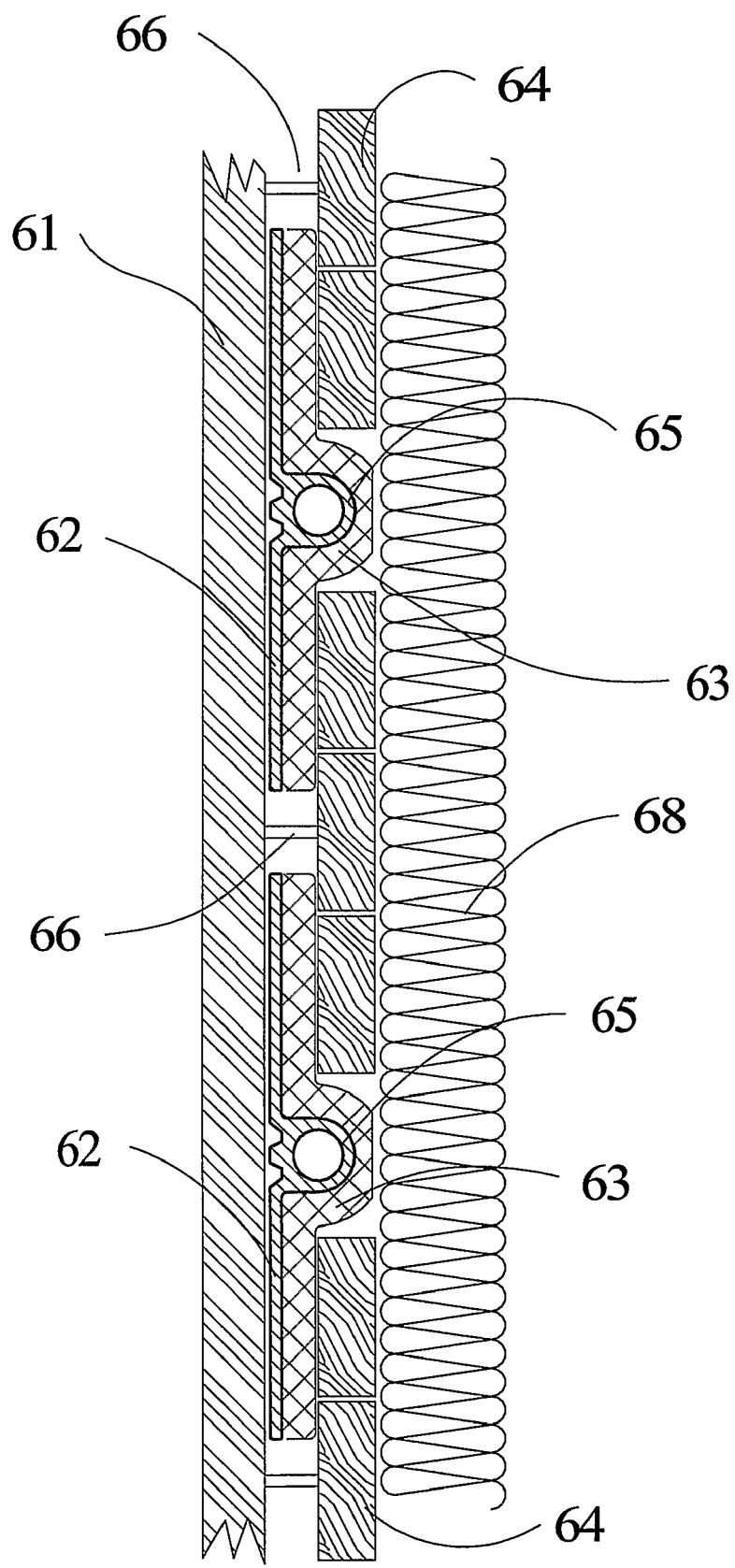
FIG. 6 shows as FIG. 3 a cross section in a part of an angled roof, the outer side of which is covered with a climate shield 81 of standing seam metal sheets.

FIG. 6 shows as FIG. 4 a cross section in a part of a roof or facade, the outer side of which is covered with a climate shield 61 of standing seam metal sheets. The metal sheets 61 are secured to a framework of wood laths, battens 64, typically having a cross sectional width of 32-100 mm and height of 22-38 mm, by mechanical means 66 such as e.g. nails, screws or fixations devices etc. The wood laths, battens are further secured to a series of rafters, which consume all large forces the roof will exhibit. In between the rafters conventional thermal house building insulation 68 is mounted with thickness typically above 100 mm. Below and close up to this climate shield a heat conducting solar panel or membrane 62 according to the present invention is mounted enclosed in the room between the wood laths, rafters 64 and the metal roof sheets. The solar panels are in the transverse direction keep in position by the friction of the insulation 63 attached to the solar panels towards the wood laths and by the groove between two corresponding wood laths in the other direction along the rafters. The panels 62 extend along a substantial length of the laths and the width of the panel is greater than the distance between two neighbouring laths so that the total area between two neighbouring laths is fully covered by the panel. At the underside and integral therewith the panel has a through-going fluid impervious channel or duct 65, which is filled with an energy carrying-capable fluid flowing from on end to the other of said channel or duct. The wings of the solar panel has a thickness of a few millimetres, e.g. 0.5 to 10 mm, preferably 1 to 4 mm, and is made of a material having good heat-conductance, e.g. a metal such as aluminium and aluminium alloys, copper and copper alloys.

Heat exchange from the rear side of the metal sheet climate shield will be transmitted to the solar panel via infrared radiation, via direct mechanical contact conduction and via convection to the solar panel top surface. Since non coated metal surfaces reflects light and to some extend long wavelength infrared radiation the solar panel top surface may preferably be coated for improved absorption of the transmitted thermal energy from the rear side of the climate shield. Black paints are often not selective to specific wavelengths, but less costly to apply to large surfaces not being a sheet. Selective coatings may be tuned to be selective for the desired wavelength. Selective coatings are typically black, with great roughness on the surface or with crystalline structure acting like small lenses.

Figure 7:
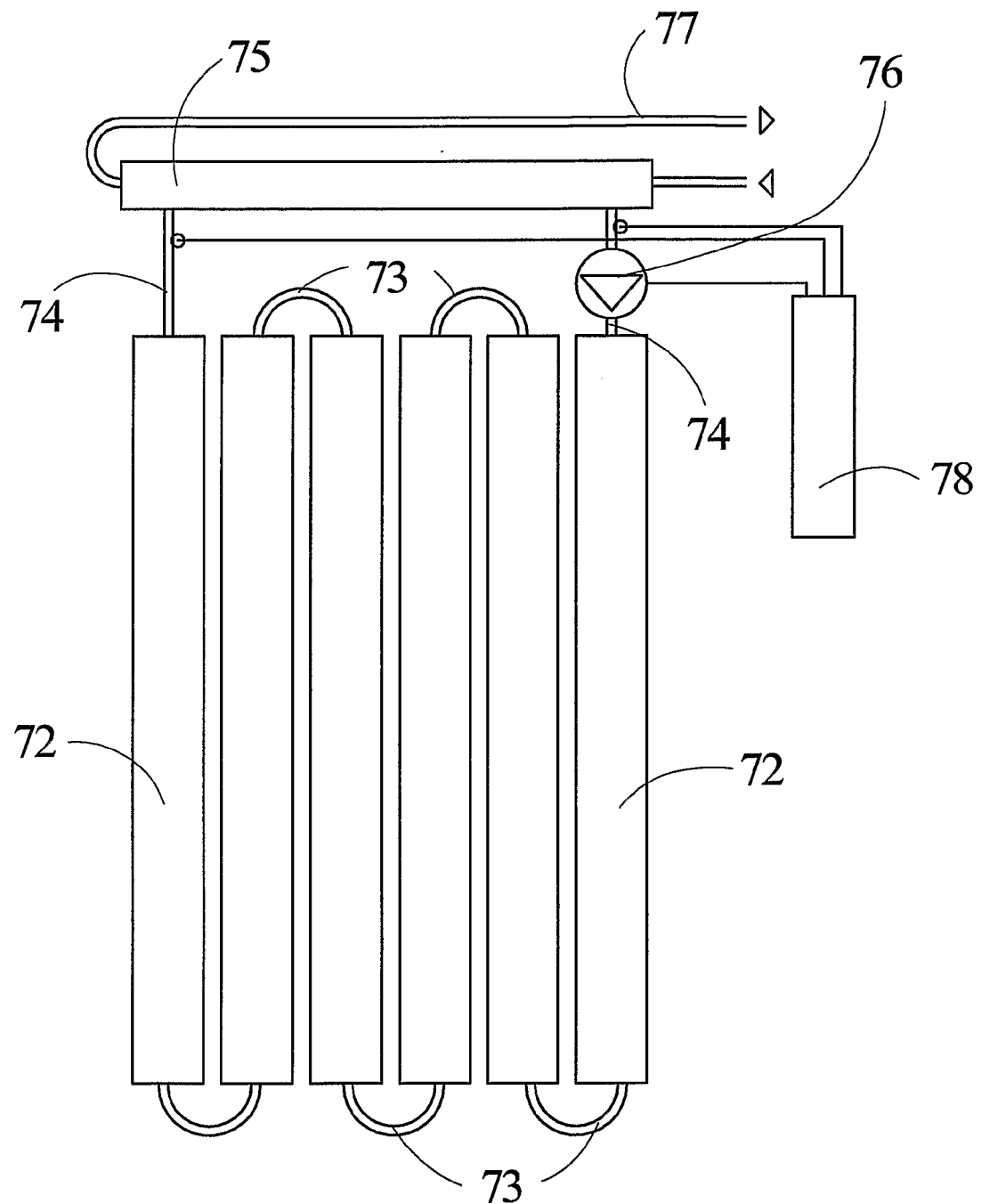
FIG. 7 is a schematic view of an energy transmitting plant comprising six heat-transmitting panels according to the present invention in close thermal contact with the underside of a quarry slate climate shield.

FIG. 7 is a schematic view of an energy carrying-capable fluid in an energy transmitting plant according to the present invention comprising six heat-transmitting panels 72 in close thermal contact with the underside of a climate shield. Each of the six panels are interconnected by short tubes or hoses 73 and connected by tubing 74 to a feed heat exchanger 75 for the establishment of a internal, primary energy flow circuit suitable for holding the energy-carrying anti corrosive fluids for protection of the solar panels. The flow circulation in this primary circuit is performed by an electrical motor driven pump 76.

The heat exchanger 75 has a secondary flow circuit 77 in which the fluid may be of another type than in the primary flow circuit such as water. A control unit 78 is connected for the primary circuit pump, which based on input from two thermal sensors determine the needed flow suitable for optimizing the energy output from all the combined solar panels.

The flow in the secondary circuit is performed by another pump (not shown).

Such plant and facility may also be used for either constant or sequential cooling purposes, e.g. for the transmission of heat to the climate shield on a building, in particular its roof, from which the excess heat or energy is radiated away, conveyed away by the air and cold environment typically during periods where the sun I not shining like during the night or in rainy weather.

All of the above figures present examples where the integrated fluid transporting channel(s) or duct(s) are placed symmetrical. Which is not regarded as a restriction of the present invention. On the contrary the panel is not limited in its design by being flat and straight only and with at least one longitudinal channel arranged symmetrical along the panel centre line. The panel may take any shape, angled shape and width, being formed as a section of a circle, with non symmetrical location of the fluid transporting channel(s) for efficient incorporation in contact with any climate shield.

It will be evident for the man skilled in the art to combine the particular details of the embodiments of the invention described above in other manners. Furthermore the selection of a gas or a liquid as the energy conveying fluid will depend on the particular circumstances in which they are to used, but such selection will be within the scope of the present invention as disclosed herein and defined in the following claims.

The invention claimed is:

1. A combination of a building, a part or component thereof, comprising:
    a climate shield; and
    an energy transmitting panel invisibly incorporated into said building, a part or component thereof, behind and in thermal contact with the climate shield on said building, a part or component thereof; said panel being made of a heat-conducting material and having a substantial heat transmitting surface area in thermal contact with the climate shield, a rear side in close contact with a thermal insulating material, and at least one through-going fluid impervious channel or duct embedded in or integrally connected with said panel for the flow of an energy carrying-capable fluid therein;
    wherein thermal contact between said climate shield and said panel is provided via direct mechanical contact conduction by direct physical contact between said climate shield and a totality of said heat substantial transmitting surface area.

2. A combination according to claim 1, wherein said climate shield is made up of natural stone slates, thin fired clay ceramic slates, thin silicon carbide slates.

3. A combination according to claim 1, wherein said building, part or component comprises a part of or the entire roof or facade of a building.

4. A combination claim 1, wherein a total surface area of the energy transmitting panel corresponds substantially to a total surface area of the climate shield behind which the panel is mounted.

5. A combination according to claim 1, wherein said energy transmitting panel is a panel included into or attached to a cassette.

6. A combination according to claim 5, wherein said energy transmitting cassette incorporates spring elements.

7. A combination according to claim 1, wherein both ends of each of the at least one fluid impervious channel or duct in the panel are connected in parallel or series or combinations thereof by respective manifolds and tubing to a heat exchange appliance in the building for reversing the heat transfer.

8. A combination according to claim 7, wherein the heat exchange appliance comprises a water heater, a radiator, a central heating or floor heating unit, a swimming pool, or a cooling unit.

9. An energy transmitting panel for invisible incorporation into a building, a part or component thereof, behind and in thermal contact with a climate shield on said building, a part or component thereof according to claim 1, said panel being made of a heat-conducting material and having a heat transmitting surface area and at least one through-going fluid impervious channel or duct embedded in or integrally connected with said panel for the flow of an energy carrying-capable fluid therein.

10. An energy transmitting panel according to claim 9, wherein said heat-conducting panel material is a metal.

11. An energy transmitting panel according to claim 10, wherein said heat-conducting panel material is a metal selected from the group consisting of aluminum and aluminum alloys, copper and copper alloys, iron and iron alloys, and stainless steels.

12. An energy transmitting panel according to claim 9, wherein said heat-conducting panel material has a thermal conductivity of more than 10 $Wm^2/K$.

13. An energy transmitting panel according to claim 9, wherein said panel with the fluid impervious channel or duct is extruded.

14. An energy transmitting cassette for invisible incorporation into a building, a part or component thereof, behind and in thermal contact with a climate shield on said building, a part or component thereof according to claim 1, said cassette comprising:
   an energy transmitting panel with two lateral legs substantially perpendicular to the plane of said panel and extending longitudinally parallel with said through-going fluid impervious channel or duct; and
   a back plate attached to ends of said legs opposite the plane of the panel to form a cavity in which the insulating material is provided.

15. An energy transmitting cassette according to claim 14, wherein said legs are integral with said panel.

16. An energy transmitting cassette according to claim 14, wherein said legs are integral with said back plate.

17. An energy transmitting cassette according to claim 14, wherein said legs are separate components having fastening means at both ends capable of being locked with corresponding fastening means at lateral edges of the panel and the back plate, respectively.

* * * * *